US009619055B2

(12) United States Patent
Matsumoto et al.

(10) Patent No.: US 9,619,055 B2
(45) Date of Patent: Apr. 11, 2017

(54) LIQUID CRYSTAL DISPLAY DEVICE (75) Inventors: Shohei Matsumoto, Chiba (JP); Eiji Oohira, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 696 days.

(21) Appl. No.: 12/868,058

(22) Filed: Aug. 25, 2010

(65) Prior Publication Data
US 2011/0050612 A1   Mar. 3, 2011

(30) Foreign Application Priority Data
Aug. 26, 2009 (JP) ................................ 2009-195245

(51) Int. Cl.
*B32B 7/12* (2006.01)
*G06F 3/041* (2006.01)
*G02F 1/1333* (2006.01)

(52) U.S. Cl.
CPC ............ *G06F 3/041* (2013.01); *G06F 3/0412* (2013.01); *G02F 2001/13332* (2013.01)

(58) Field of Classification Search
CPC . F21V 7/04; F21V 9/16; G02F 1/1333; B32B 7/12; G02B 5/22; G02B 6/0083; G06F 3/0412
USPC ............. 349/122, 58; 359/885; 362/84, 607; 428/343
See application file for complete search history.

(56) References Cited

U.S. PATENT DOCUMENTS

| | | | |
|---|---|---|---|
| 6,388,722 B1* | 5/2002 | Yoshii .................. | G02B 6/0083 349/58 |
| 6,538,709 B1* | 3/2003 | Kurihara et al. ............... | 349/58 |
| 6,879,318 B1* | 4/2005 | Chan et al. .................... | 345/173 |
| 7,413,336 B2* | 8/2008 | Freking et al. ................ | 362/627 |
| 2002/0054261 A1* | 5/2002 | Sekiguchi ........... | G02F 1/13338 349/122 |
| 2002/0168516 A1* | 11/2002 | Luhmann et al. ............ | 428/352 |
| 2003/0133207 A1* | 7/2003 | Minami ................... | G02B 5/20 359/885 |
| 2004/0062983 A1* | 4/2004 | Abe et al. ....................... | 429/162 |
| 2005/0046767 A1* | 3/2005 | Freking et al. ................. | 349/62 |
| 2005/0094039 A1* | 5/2005 | Kim et al. ....................... | 349/12 |
| 2005/0207137 A1* | 9/2005 | Nishikawa .............. | G06F 3/041 362/84 |

(Continued)

FOREIGN PATENT DOCUMENTS

JP  2008-083491  4/2008

*Primary Examiner* — Nicholas Lee
*Assistant Examiner* — Abdul-Samad A Adediran
(74) *Attorney, Agent, or Firm* — Typha IP LLC (57) ABSTRACT

In a liquid crystal display panel including a touch panel and a front window, it is possible to reduce the reproduction cost of the touch panel, achieving a high yield in the reproduction of the touch panel. The touch panel and the front window are bonded together by a PET film and a UV curable resin. When air bubbles or other defects are found between the front window and the touch panel, the front window and the touch panel are detached by cutting the UV curable resin by a cutter blade, in order to reproduce the touch panel. The residue of the UV curable resin left on the PET film is removed by detaching the PET film from the touch panel. A tab in which the adhesive is not formed is provided in an end of the PET film, so that the PET film can be easily detached from the touch panel, starting from the tab.

9 Claims, 11 Drawing Sheets (56) References Cited

U.S. PATENT DOCUMENTS

| | | |
|---|---|---|
| 2006/0193148 A1* | 8/2006 | Bang ................ G02F 1/133603 362/607 |
| 2007/0059520 A1* | 3/2007 | Hatin .................. G06F 3/0412 428/343 |
| 2007/0107745 A1* | 5/2007 | Kiyomoto ...................... 132/73 |
| 2008/0094372 A1* | 4/2008 | Philipp ........................ 345/173 |
| 2008/0116425 A1* | 5/2008 | Yasuda ...................... 252/518.1 |
| 2008/0122315 A1* | 5/2008 | Maruyama et al. .......... 310/314 |
| 2008/0304000 A1* | 12/2008 | Abe .............................. 349/150 |
| 2009/0087655 A1* | 4/2009 | Yamada et al. ............... 428/354 |
| 2009/0109367 A1* | 4/2009 | Chu et al. ..................... 349/58 |
| 2009/0229732 A1* | 9/2009 | Determan et al. ............. 156/60 |
| 2010/0026662 A1* | 2/2010 | Oohira .......................... 345/174 |
| 2010/0039578 A1* | 2/2010 | Roh et al. ..................... 349/58 |
| 2010/0182254 A1* | 7/2010 | Lee et al. ..................... 345/173 |
| 2010/0182281 A1* | 7/2010 | Lee et al. ..................... 345/175 |
| 2010/0208179 A1* | 8/2010 | Chang et al. ................ 349/110 |
| 2010/0244682 A1* | 9/2010 | Lee et al. ..................... 313/512 |
| 2010/0321621 A1* | 12/2010 | Kikuchi et al. ............... 349/122 |
| 2011/0050612 A1* | 3/2011 | Matsumoto et al. ......... 345/173 |
| 2011/0188125 A1* | 8/2011 | Takenaka et al. ............ 359/634 |
| 2011/0221702 A1* | 9/2011 | Tanaami ....................... 345/174 |
| 2011/0268929 A1* | 11/2011 | Tran et al. .................... 428/189 |
| 2011/0310537 A1* | 12/2011 | Imamura et al. ........ 361/679.01 |
| 2012/0064304 A1* | 3/2012 | Bharti et al. .................. 428/189 |

* cited by examiner

LIQUID CRYSTAL DISPLAY DEVICE

CLAIM OF PRIORITY

The present application claims priority from Japanese Patent Application JP 2009-195245 filed on Aug. 26, 2009, the content of which is hereby incorporated by reference into this application.

FIELD OF THE INVENTION

The present invention relates to a liquid crystal display device, and more particularly to a small display device having a touch panel used for mobile phones or other electronic devices.

BACKGROUND OF THE INVENTION

A liquid crystal display device includes a TFT substrate and a color filter substrate. The TFT substrate is configured such that pixel electrodes, thin film transistors (TFTs) and the like are arranged in a matrix form. The color filter substrate is disposed opposite to the TFT substrate in which color filters and the like are formed at locations corresponding to the pixel electrodes of the TFT substrate. A liquid crystal is interposed between the TFT substrate and the color filter substrate. Then, an image is formed by controlling the transmittance of light of the liquid crystal molecules for each pixel.

The liquid crystal display device can be made small and thin, and is used in a wide range of applications such as mobile phones and other electronic devices. In recent years, various types of applications have been added to the mobile phone. Also, the input device is expected to have a function allowing finger input through a touch panel, in addition to the conventional key-button operation. In this case, the touch panel is attached on the side of the color filter substrate of the liquid crystal display panel.

Along with the demand for a smaller overall size of the liquid crystal display device itself, there is a strong demand for a thin liquid crystal display panel, while keeping the size of the screen unchanged. In order to meet the demand for a thin liquid crystal display panel, a liquid crystal display panel is produced, and then the outside of the liquid crystal display panel is polished to a desired thickness. The liquid crystal display panel is formed by the TFT substrate including pixel electrodes, thin film transistors (TFTs), and the like, and by the color filter substrate including color filters. The two substrates constituting the liquid crystal display panel are glass substrates that are standardized, for example, to a thickness of 0.5 mm or 0.7 mm. It is difficult to obtain such standardized glass substrates from the market. In addition, a very thin glass substrate has a problem relating to mechanical strength and bending in the production process, leading to a reduction in the production yield. For this reason, the liquid crystal display panel is formed from the standardized glass substrates, and then the outside of the liquid crystal display panel is polished to a desired thickness.

The reduction of the thickness of the liquid crystal display panel poses a problem of the mechanical strength. When a mechanical stress is applied to the display surface of the liquid crystal display panel, there is a risk that the liquid crystal display panel will be destroyed. The situation is the same with the liquid crystal display panel on which the touch panel is placed, due to the small thickness of the touch panel.

In order to prevent the liquid crystal display panel from being destroyed by an external force, a front window of resin or glass is attached to the screen side of the liquid crystal display panel. In this case, an air layer is present between the liquid crystal display panel and the touch panel, or between the touch panel and the front window. The transmittance of the light from the backlight is reduced by the reflection from the interface in this area.

In order to prevent this, JP-A No. 83491/2008 describes a configuration in which an adhesive layer or an anti-reflection coating is formed between the liquid crystal display panel and the touch panel, or between the touch panel and the front window. It also describes a configuration in which a main flexible wiring substrate is attached to the liquid crystal display panel, and a touch-panel flexible wiring substrate is attached to the touch panel. The main flexible wiring substrate connects the liquid crystal display panel and the external circuit to each other. The touch-panel flexible wiring substrate connects the touch panel and the external circuit to each other. In JP-A No. 83491/2008, the touch panel is of a capacitance type and can function as a touch panel with the front window thereon.

The capacitance-type touch panel allows various operations. Such various operations can be performed by a touch-panel flexible wiring substrate including a touch-panel control IC and a touch-panel electronic component. The touch-panel flexible wiring substrate is connected to a top end of the touch panel. The size of the front window is larger than the touch panel. Thus, in order to connect the touch-panel flexible wiring substrate to the touch panel, it is necessary to increase the thickness of a bonding layer between the front window and the touch panel. Up to now, an adhesive sheet has been used as the bonding layer.

When air bubbles entering into the bonding layer or other defects are found after bonding of the touch panel and the front window, it is necessary to repair the defective part by detaching the touch panel and the front window from each other. In the repair operation, in general, the touch panel is relieved and the front window is discarded, because the touch panel is more expensive than the front window.

The touch panel and the front window are detached from each other by a cutter blade, which will be described below. However, a portion of the adhesive sheet is left on the side of the touch panel after detachment. Up to now, the residual adhesive sheet has been removed by using a cloth with a solvent. However, such a removal operation requires manpower, consequently leading to an increase in the repair cost. Further, it has often occurred that the surface of the touch panel is scratched and damaged in the removal of the adhesive material left on the touch panel.

SUMMARY OF THE INVENTION

Thus, when the touch panel and the front window are detached from each other for repair, it is desirable not only to suppress the repair cost but also to reduce the percentage the discarded touch panels in the repair operation.

The present invention overcomes the above problems by the following means.

(1) In a liquid crystal display device, a liquid crystal display panel and a backlight are placed in a resin mold. A touch panel is attached to the liquid crystal display panel. A front window is attached to the touch panel. The touch panel and the front window are bonded together by a plastic film in which an adhesive material is formed on a plastic substrate, and by an UV curable resin. A tab is present in a corner of the plastic film, in which the adhesive material is not formed.

(2) In the liquid crystal display device described in (1), the plastic film is a PET film.

(3) In the liquid crystal display device described in (1), a protrusion of the tab is 0.2 mm or more.

(4) In a liquid crystal display device, a liquid crystal display panel and a backlight are placed in a resin mold. A touch panel is attached to the liquid crystal display panel. A front window is attached to the touch panel. The touch panel and the front window are bonded together by a plastic film in which an adhesive material is formed on a plastic substrate, and by a UV curable resin. An area in which the adhesive material is not formed is present in a corner of the plastic film.

(5) In the liquid crystal display device described in (4), the plastic film is a PET film.

(6) In the liquid crystal display device described in (4), the area in which the adhesive material is not formed has a chamfered shape in the corner of the plastic film. An amount of c in the chamfered corner is 0.2 mm or more.

According to the present invention, in the liquid crystal display device including the touch panel and the front window, it is possible to reduce the number of man-hours for detaching the touch panel and the front window from each other and for reproducing the touch panel. As a result, the reproduction cost can be reduced. Further, it is also possible to reduce the risk that the touch panel will be damaged in the reproduction process. As a result, a high reproduction yield can be achieved in the reproduction process of the touch panel.

DETAILED DESCRIPTION OF THE PREFERRED EMBODIMENTS

Figure 1:
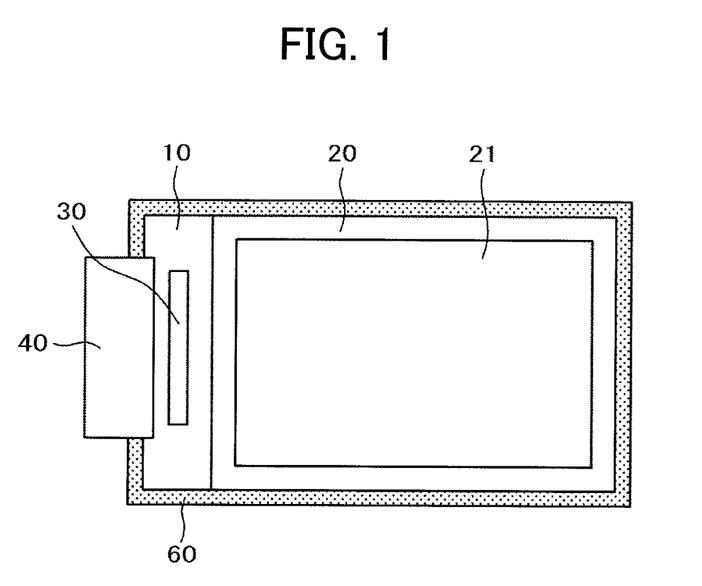
FIG. 1 is a top view of a liquid crystal display device.

Before specific embodiments are described, the description will focus on a liquid crystal display device to which the present invention is applied. FIG. 1 is a top view of a liquid crystal display panel used for mobile phones or other electronic devices, according to the present invention. In FIG. 1, a color filter substrate 20 is placed above a TFT substrate 10. A liquid crystal layer, not shown, is interposed between the TFT substrate 10 and the color filter substrate 20. The TFT substrate 10 and the color filter substrate 20 are bonded together by a sealing material, not shown, formed in the frame portion. The TFT substrate 10 is made larger than the color filter substrate 20. A terminal portion is formed in a portion of the TFT substrate 10 extending beyond the color filter substrate 20. The terminal portion of the TFT substrate 10 supplies power, image signals, scan signals, and the like to the liquid crystal display panel.

An IC driver 30 is provided in the terminal portion of the TFT substrate 10 to drive scan lines, image signal lines, and the like. A scan line driving circuit and an image signal line driving circuit are formed in the IC driver 30. Then, scan signals and image signals are supplied to the IC driver 30 through the main flexible wiring substrate 40 connected to the terminal portion.

The upper polarization plate 21 is attached to the top of the TFT substrate 10. The overall size of the upper polarization plate 21 is substantially equal to the display area. In other words, the liquid crystal can control only polarized light, so that a lower polarization plate is attached to the bottom of the TFT substrate 10 in order to polarize the light from the backlight into linearly polarized light. The linearly polarized light is modulated by the liquid crystal layer, resulting in the change in the transmittance of each pixel, and thus an image is formed. Then, the image is polarized (analyzed) again by the upper polarization plate 21 and is visible to the human eyes.

The whole liquid crystal display panel is placed in a frame-like resin mold 60. The backlight described below is placed below the liquid crystal display panel in the resin mold 60. In FIG. 1, the main flexible wiring substrate 40 is connected to the terminal portion of the liquid crystal display panel. The main flexible wiring substrate 40 is folded at the end of the resin mold 60 so as to extend along the back surface of the resin mold 60. In this way, the overall size of the liquid crystal display device is reduced.

Figure 2:
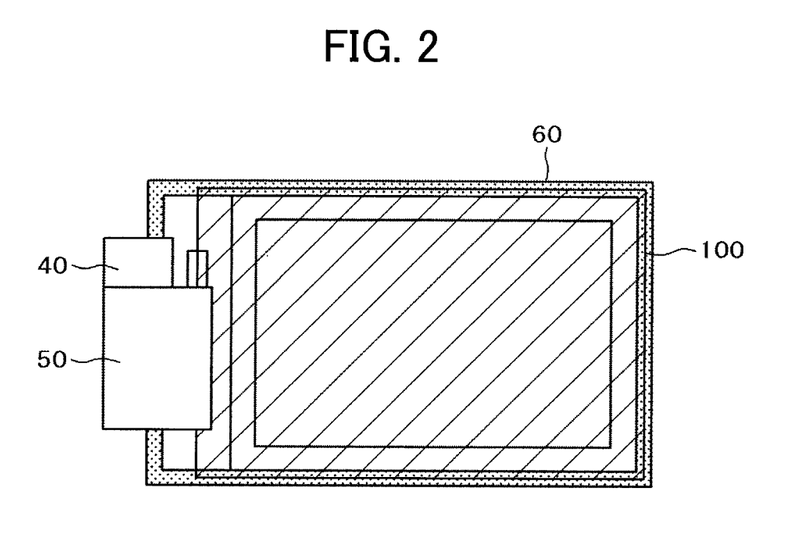
FIG. 2 is a top view of the liquid crystal display device to which a touch panel is attached.

FIG. 2 is a top view in which a touch panel 100 is bonded to the liquid crystal display panel which has been described in FIG. 1. The touch panel 100 is made slightly larger than the color filter substrate 20 of the liquid crystal display panel. Thus, the touch panel 100 also covers a part of the resin mold 60. In FIG. 2, a touch-panel flexible wiring substrate 50 is attached to the end of the touch panel 100 in order to supply power and signals to the touch panel 100. Similarly to the main flexible wiring substrate 40, the touch-panel flexible wiring substrate 50 is also folded at the end of the resin mold 60 so as to extend along the back surface of the resin mold 60. In this way, the overall size of the liquid crystal display device is reduced.

In general, a touch panel substrate is formed from glass. However, a plastic substrate may also be used if it is transparent and can sustain anneal temperatures for ITO, and the like. Examples of the transparent resin may include acryl and polycarbonate. The substrate of the touch panel 100 is attached to the upper polarization plate 21, which is placed on the color filter substrate 20 of the liquid crystal display panel, by an adhesive material 110. An example of the adhesive material 110 is a transparent acrylic adhesive.

Figure 3:
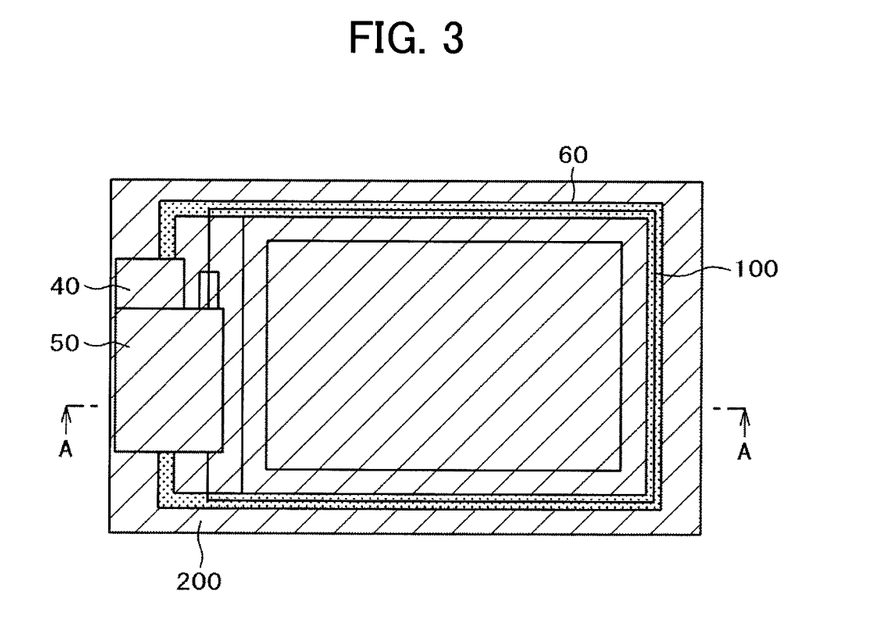
FIG. 3 is a top view of the liquid crystal display device to which a front window is attached.

In FIG. 3, a front window 200 is attached to the touch panel 100, which is attached to the liquid crystal display panel as shown in FIG. 2. In general, the front window 200 is formed from glass with a thickness of about 0.5 mm. Plastic such as acrylic resin and polycarbonate resin can be used as the material of the front window 200.

The touch-panel flexible wiring substrate is provided between the front window and the touch panel. Thus, the thickness of the bonding layer between the front window and the touch panel should be about 100 μm or more. Up to now, an adhesive sheet has been used for the bonding layer. However, taking into account the repair cost and the reproduction yield of the touch panel 100, the present invention uses a PET film with an adhesive material formed on one side, as well as a UV adhesive to increase the distance between the touch panel 100 and the front window 200. In this case, both the UV curable resin and the adhesive material formed on the PET film are thermoplastic, taking into account reproduction or repair.

In FIG. 3, the overall size of the front window 200 is larger than the liquid crystal display panel and the resin mold 60 to protect the whole liquid crystal display panel. The front window 200 also covers and protects the main flexible wiring substrate 40 attached to the TFT substrate 10, as well as the touch-panel flexible wiring substrate 50 attached to the touch panel 100.

Figure 4:
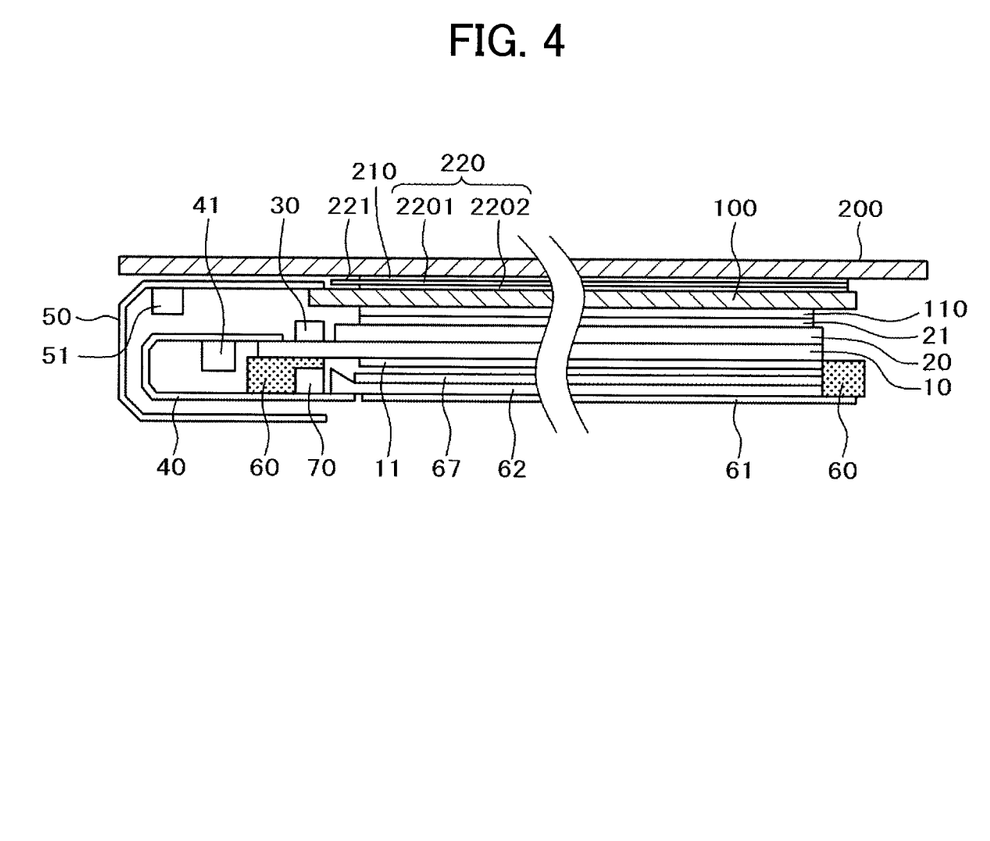
FIG. 4 is a cross-sectional view of the liquid crystal display device according to the present invention.

FIG. 4 is a cross-sectional view taken along line A-A of FIG. 3. The touch panel 100 is bonded by the adhesive sheet 110 to the upper polarization plate 21 that is bonded to the color filter substrate 20. The front window 200 is bonded to the touch panel 100 by a PET film 220 and a UV curable resin 210. The PET film 220 is configured such that an adhesive material 2202 is formed on a PET substrate 2201. By taking into account repair, the adhesive material 2202 of the PET film 220 as well as the UV curable resin 210 are both thermoplastic. It is to be noted that in the present specification, as described in the description of the PET film 220, it is also possible to use a plastic film having a configuration other than the PET film, in which an adhesive material is formed on a plastic substrate.

The touch-panel flexible wiring substrate 50 is connected to the touch panel 100. The touch-panel flexible wiring substrate 50 is provided with an electronic component 51 of the touch panel 100. The electronic component 51 of the touch panel 100 is provided on the underside of the touch-panel flexible wiring substrate 50.

The touch-panel flexible wiring substrate 50 is present in the end of the touch panel 100. Thus, in order to prevent the touch panel 100 and the front window 200 from coming into contact with each other, the touch panel 100 and the front window 200 are kept separate by using both the PET film 220 and the UV curable adhesive 210.

An example of the UV curable resin 210 may be an acrylic based resin containing 27% to 30% acrylic oligomer with additives such as UV reactive monomer and photopolymerization initiator. The front window 200 may be formed from a plastic such as polycarbonate or acryl. The overall size of the front window 200 is large enough to cover both the touch-panel flexible wiring substrate 50 and the main flexible wiring substrate 40.

In FIG. 4, the IC driver 30 is provided in the terminal portion of the TFT substrate 10 of a liquid crystal cell. Further, the main flexible wiring substrate 40 is connected to a terminal formed in the TFT substrate 10. The main flexible wiring substrate 40 is folded so as to extend along the back surface of the liquid crystal display panel.

The main flexible wiring substrate 40 is provided with an LCD electronic component 41. In FIG. 4, the front window 200 is designed to also cover the LCD electronic component 41 attached to the main flexible wiring substrate 40. It is to be noted that the electronic component is not necessarily provided downward in the main flexible wiring substrate 40 as shown in FIG. 4. The electronic component may be provided upward in a portion of the flexible wiring substrate extending along the back surface of the backlight, depending on the layout design.

In FIG. 4, the electronic component is provided on the underside of the main flexible wiring substrate 40. Similarly to the other electronic component, a light emitting diode 70 is also provided on the underside of the main flexible wiring substrate 40. However, the light emitting diode 70 is provided in a portion of the main flexible wiring substrate 40 folded behind the resin mold 60. In other words, when the main flexible wiring substrate 40 is folded behind the resin mold 60, the light emitting diode 70 can be placed in a convex formed in the resin mold 60. Then, as shown in FIG. 4, the light emitting diode 70 is disposed facing the end of a light guide panel 62 to form a part of the backlight. The light emitting diode 70 used in the present embodiment is white light emitting diode 70.

In FIG. 4, the liquid crystal display panel is placed on the resin mold 60. The resin mold 60 has a square frame shape. In FIG. 4, a lower polarization plate 11 of the liquid crystal display panel is placed in the resin mode 60. The backlight is provided on the back side of the lower polarization plate 11. The backlight has the following configuration.

The light guide panel 62 is disposed so that the end thereof faces the light emitting diode 70. The role of the light guide panel 62 is to direct the light, which is emitted from the light emitting diode 70 and enters from the side surface, towards the liquid crystal display panel. The size of the light emitting diode 70 is large. Thus, the thickness of the whole liquid crystal display device is reduced by increasing the thickness of the portion of the light guide panel 62 facing the light emitting diode 70, and by reducing the thickness of the portion of the light guide panel 62 on which an optical sheet is placed as described below.

In FIG. 4, a reflective sheet 61 is provided under the light guide panel 62. This is in order to reflect and direct the light emitted downward from the light guide panel 62, towards the liquid crystal display panel. An optical sheet group 67 is provided on the top of the light guide panel 62. The optical sheet group 67 includes a lower diffusion sheet, a lower prism sheet, an upper prism sheet, an upper diffusion sheet, and the like.

The optical sheet group 67 is placed on the light guide panel 62. For example, the distance between the upper diffusion sheet, which is the top of the optical sheet group 67, and the lower polarization plate 11 of the liquid crystal display panel is about 50 μm. This makes it possible to prevent scratches caused by friction between the lower polarization plate 11 and the upper diffusion sheet.

In FIG. 4, the main flexible wiring substrate 40 is connected to the liquid crystal display panel, and the touch-panel flexible wiring substrate 50 is connected to the touch panel 100. The two flexible wiring substrates are folded so as to extend along the back surface of the liquid crystal display panel. The main flexible wiring substrate 40 and the touch-panel flexible wiring substrate 50 are connected to each other in a place not shown in FIG. 4.

First Embodiment

In FIGS. 1 to 4, the configuration has been described from the liquid crystal display panel side, in order to explain the liquid crystal device to which the present invention is applied. However, the liquid crystal display device is actually assembled in the following manner. First, a liquid crystal display panel and a backlight are placed on or in a resin mold to form a liquid crystal module. Next, a touch panel and a front window are bonded together. Then, the touch panel and the liquid crystal module are bonded together by the PET film 220 and the UV curable resin 210.

The present invention particularly focuses on the connecting portion between the touch panel 100 and the front window 200. In other words, taking into account the thickness of the touch-panel flexible wiring substrate 50, the touch panel 100 and the front window 200 should be bonded with a sufficient thickness. Further, when the touch panel 100 and the front window 200 are detached from each other for repair, the detachment should be easy to achieve a high reproduction yield of the touch panel 100.

Figure 5:
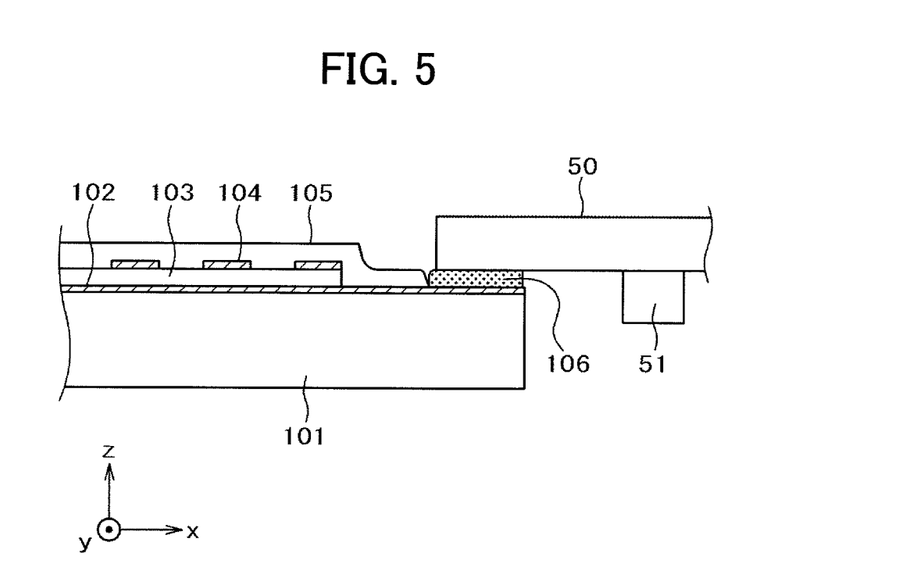
FIG. 5 is a cross-sectional view of the touch panel.

FIG. 5 is a schematic cross-sectional view of the touch panel 100 of a capacitance type. In FIG. 5, lower lines 102 are formed on the touch panel substrate 101. An insulating layer 103 is formed on the lower lines 102. Then, upper lines 104 are formed on the insulating layer 103. Further, a protective layer 105 is formed to cover the upper lines 104.

In general, the touch panel substrate 101 is formed from glass. However, a plastic substrate may also be used if it is transparent and can sustain anneal temperatures for ITO, and the like. Examples of the transparent resin may include acryl and polycarbonate.

The lower lines 102 are formed on the surface of the touch panel substrate 101. The lower lines 102 are formed from ITO which is a transparent conductive film. The ITO is deposited by sputtering, and is patterned into strips which extend in the x direction and are arranged in the y direction, namely, in the direction perpendicular to the paper.

The insulating layer 103 of $SiO_2$ film or SiN film is formed to cover the lower lines 102. The upper lines 104 are also formed from a transparent conductive film of ITO. The ITO is deposited by sputtering, and is patterned into stripes which extend in the y direction, namely, in the direction perpendicular to the paper, and are arranged in the x direction.

In FIG. 5, the lower lines 102 and the upper lines 104 are arranged perpendicular to each other. The lower lines 102 and the upper lines 104 form the sides of squares, when seen from the top. The lower lines 102 and the upper lines 104 can also be patterned into strips extending in an oblique direction to the line of the touch panel 100. In such a case, the lower lines 102 and the upper lines 104 form the sides of rhombuses, when seen from the top.

The upper lines 104 are covered and protected by the protective layer 105 which is formed from $SiO_2$ film or SiN film. In this embodiment, the front window 200 is placed on the touch panel 100. However, when the front window 200 is not provided, the touch panel 100 is directly touched by a special pen or a finger. Thus, the protective layer 105 prevents the lines from being damaged.

In FIG. 5, the upper line 104 is electrically connected to the terminal portion of the touch panel 100 through a through hole, not shown, formed in the insulating layer 103. The terminal of the touch panel 100 can supply signals and current both to the upper line 104 and to the lower line 102. For this reason, one touch-panel flexible wiring substrate 50 is enough to be connected to the touch panel 100. The touch-panel flexible wiring substrate 50 is connected by an anisotropic conductive film 106, in the terminal portion of the touch panel 100.

Figure 6:
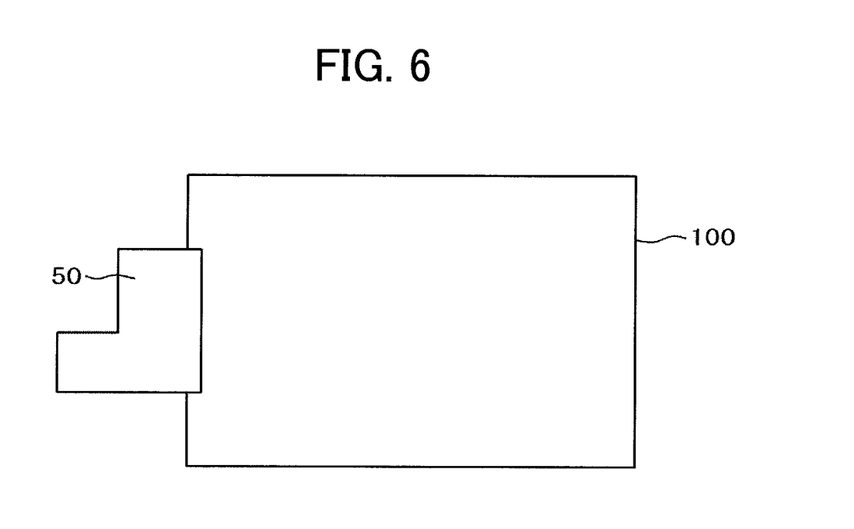
FIG. 6 is a top view of the touch panel.
Figure 7:
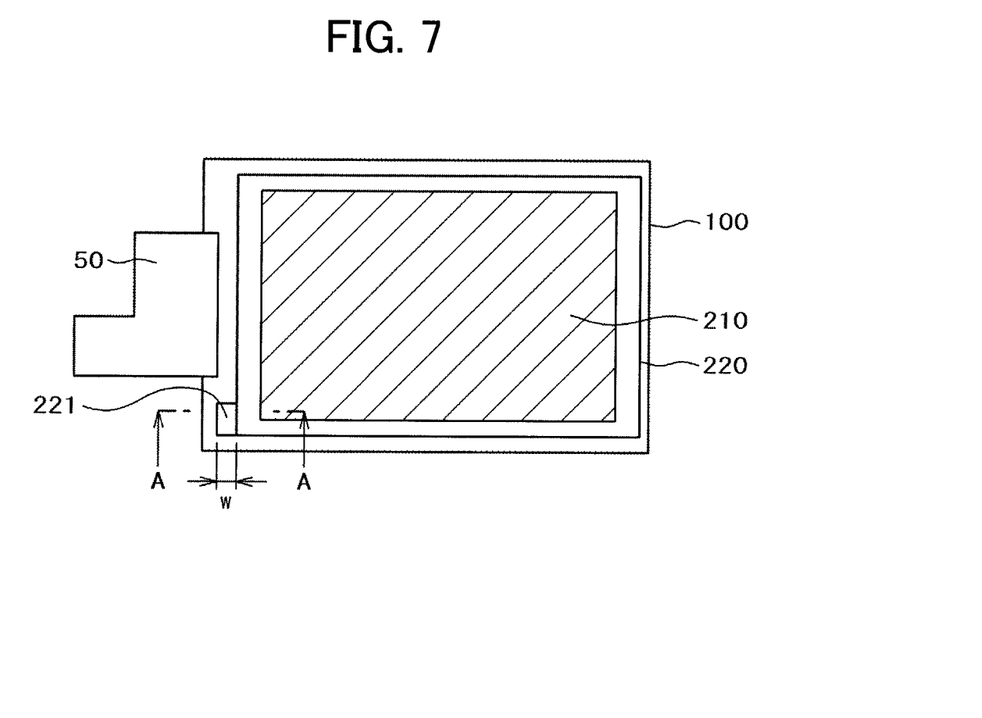
FIG. 7 is a top view in which a PET film and a UV curable resin are formed on the surface the touch panel.

FIG. 6 is a top view of the touch panel 100. In FIG. 6, the detailed configuration of the touch panel 100 has been described in FIG. 5, and thus is omitted here. FIG. 7 is a top view in which the PET film 220 and the UV curable resin 210 are formed on the surface of the touch panel 100 to bond the touch panel 100 to the front window 200. Actually, the PET film 220 is bonded to the protective layer 105 of the touch panel 100 described in FIG. 5. In FIG. 7, the overall size of the PET film 220 is slightly smaller than the overall size of the touch panel 100. The overall size of the UV curable resin 210 formed on the PET film 220 is slightly smaller than the overall size of the PET film 220.

Figure 8:
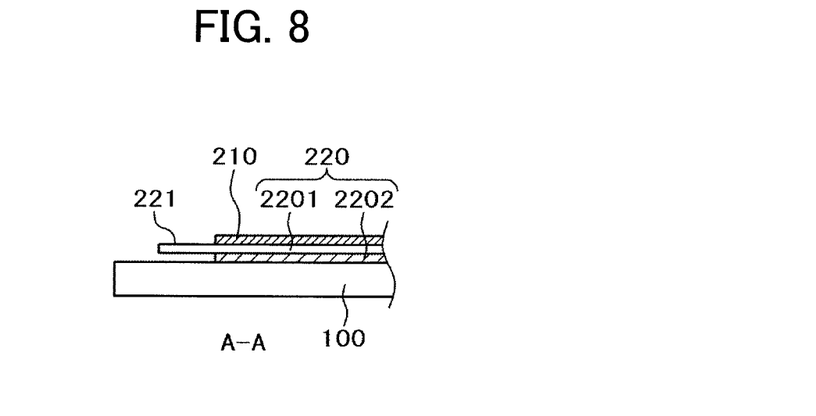
FIG. 8 is a cross-sectional view of the corner portion of FIG. 7.

In FIG. 7, a tab 221 is formed in a corner of the PET film 220, in order to detach the PET film 220 from the touch panel 100 starting from the tab 221 for reproduction. The adhesive material 2202 is not formed in the tab 221. In FIG. 7, the width of the tab 221, namely, the protrusion w is 0.2 mm or more. FIG. 8 is a cross-sectional view taken along line A-A of FIG. 7. In FIG. 8, the PET film 220 including the substrate 2201 and the adhesive material 2202 is attached to the surface of the touch panel 100. The UV curable resin 210 is formed on the PET film 220. The tab 221 is formed in the left corner of the PET film 220. The adhesive material 2201 is not present in the tab 221. In other words, because the adhesive material is not formed in the tab 221, it is easy to detach the PET film 220 left in the touch panel 100 starting from the tab 221 when the touch panel 100 is repaired.

Figure 9:
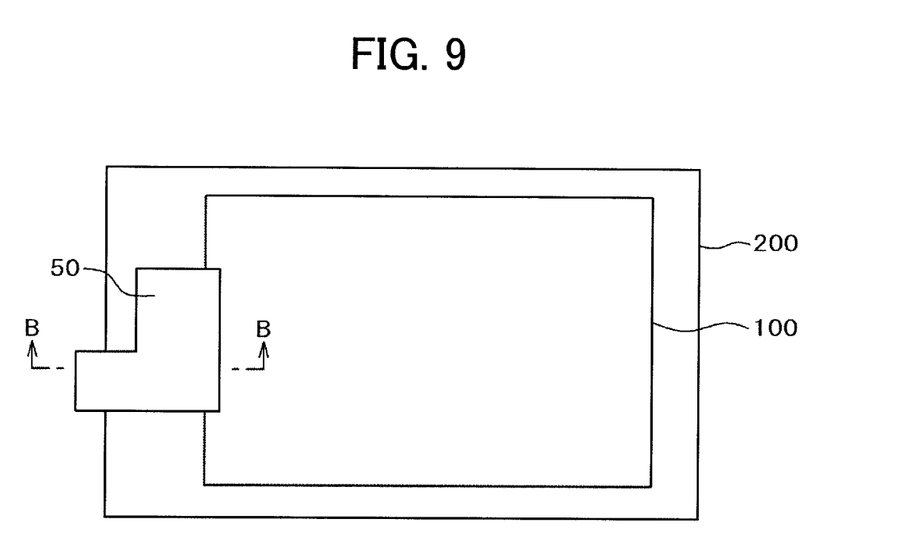
FIG. 9 is a top view in which the front window is attached to the touch panel.

FIG. 9 is a top view in which the front window 200 is attached to the touch panel 100 in which the PET film 220 and the UV curable resin 210 are formed. As described in FIG. 4 and other figures, the overall size of the front window 200 is larger than the overall size of the touch panel 100. In FIG. 9, the touch panel 100 and the front window 200 are bonded together by the UV curable resin 210. At this time, the bonding is performed in a reduced-pressure atmosphere to prevent the entrainment of air bubbles and the like. Then, ultraviolet (UV) light is irradiated onto the UV curable resin 210 to cure it, and thus the touch panel 100 and the front window 200 are bonded together.

Figure 10:
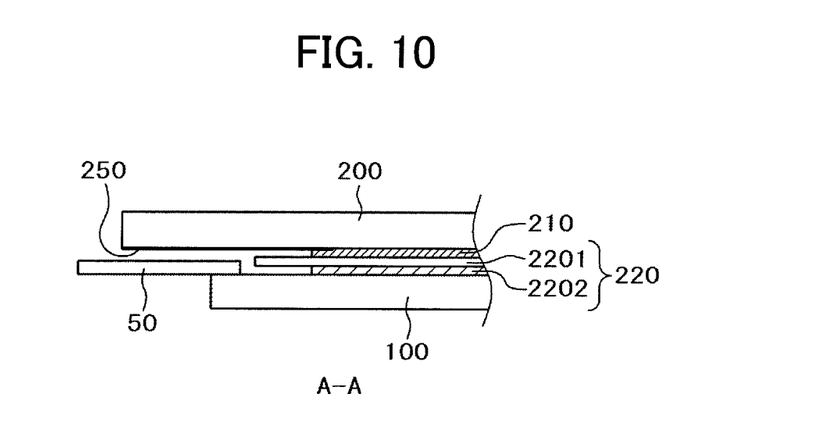
FIG. 10 is a partial cross-sectional view in which the front window is attached to the touch panel according to the present invention.

FIG. 10 is a cross-sectional view taken along line B-B of FIG. 9, which is a detailed view in which the touch panel 100 and the front window 200 are bonded together. In FIG. 10, the touch-panel flexible wiring substrate 50 is connected to the end of the touch panel 100. The PET film 220 including the substrate 2201 and the adhesive material 2202, as well as the UV curable resin 210, are present between the touch-panel flexible wiring substrate 50 and the front window 200. Further, a printing frame 250 is formed as a light-shielding pattern in the periphery of the front window 200. The printing frame 250 is formed by printing in a frame shape on the inside of the front window 200.

In FIG. 10, the thickness of the touch-panel flexible wiring substrate 50 is about 70 μm. For example, assuming that the thickness of the PET film 220 is 75 μm (in which the thickness of the substrate 2201 is 50 μm and the thickness of the adhesive material 2202 is 25 µm), and the thickness of the UV curable resin 210 is 35 µm, the total thickness is 110 µm. Thus, even taking into account about 10 µm for the thickness of the printing frame 250, it is possible to prevent the detachment stress on the touch panel 100 and on the front window 200 due to the presence of the touch-panel flexible wiring substrate 50 between them.

Figure 11:
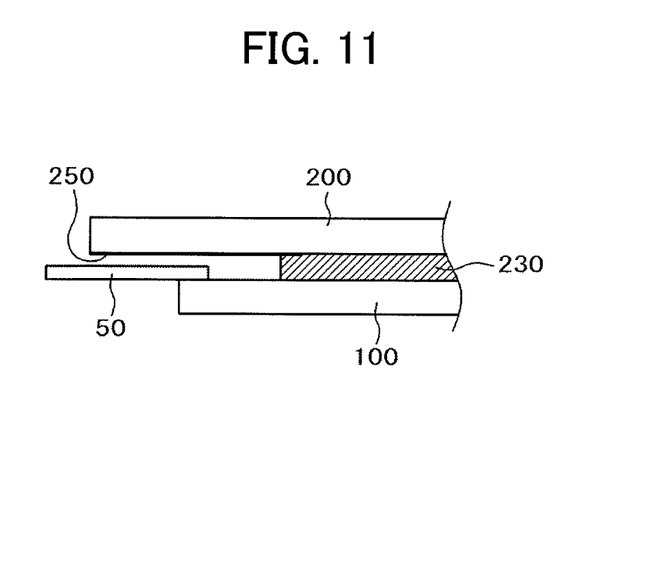
FIG. 11 is a partial cross-sectional view in which the front window is attached to the touch panel, according to a conventional example.

FIG. 11 shows a conventional example in which the touch panel 100 and the front window 200 are bonded together by an adhesive sheet 230. In FIG. 11, the thickness of the touch-panel flexible wiring substrate 50 is about 70 µm. Thus, in order to prevent the interference between the touch-panel flexible wiring substrate 50 and the front window 200, the thickness of the adhesive sheet 230 should be about 100 µm.

When air bubbles or other defects are found after the touch panel 100 and the front window 200 are bonded together, the touch panel 100 and the front window 200 are detached from each other to reproduce the touch panel 100. The UV curable resin 210 in FIG. 10 according to the present invention, as well as the adhesive sheet 250 in FIG. 11 according to the conventional example, are both thermoplastic by taking into account repair.

Figure 12:
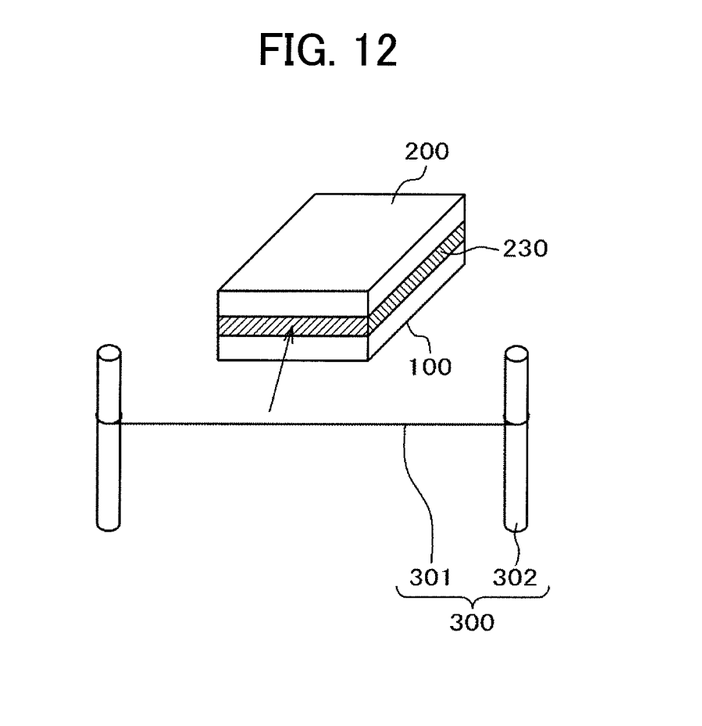
FIG. 12 is a schematic view showing the operation of detaching the touch panel and the front window from each other in repair process.

Thus in the repair operation, the touch panel 100 and the front window 200, which are bonded together, are first heated. Next, the heated and softened UV curable resin 210 or adhesive sheet 250 is cut by a cutter blade 300. FIG. 12 is a schematic view in which the touch panel 100 and the front window 200 are separated by the cutter blade 300.

Figure 13:
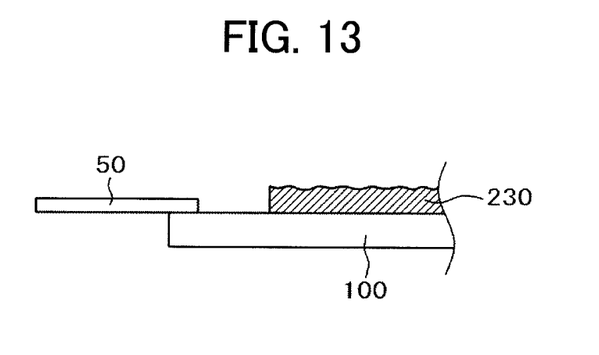
FIG. 13 is a cross-sectional view of the touch panel from which the front window is separated, according to the conventional example.

In FIG. 12, the cutter blade 300 includes a thin wire 301 and a supporting jig 302. In FIG. 12, the front window 200 and the touch panel 100 are bonded together by the adhesive sheet 230. The adhesive sheet 230 is cut by the thin wire 301 of the cutter blade 300. In this way, the front window 200 and the touch panel 100 are separated from each other. FIG. 13 is a schematic cross-sectional view on the side of the touch panel 100, in which the adhesive sheet 230 shown in FIG. 11, according to the conventional example, is cut by the cutter blade 300 as shown in FIG. 12.

In FIG. 13, the adhesive sheet 230 is left on the touch panel side. The touch panel 100 would not be reused as it is with the adhesive sheet 230 left thereon. Thus, it is necessary to remove the residue of the adhesive sheet 230 left on the touch panel 100. The residue of the adhesive sheet 230 is wiped off by hand using a cloth with a solvent, and the like. This leads to an increase in the cost of reusing the touch panel 100. Further, when the residue is wiped off by the cloth, the protective layer 105 on the surface of the touch panel 100 may be scratched. This leads to a reduction in reproduction yield of the touch panel 100.

Figure 14:
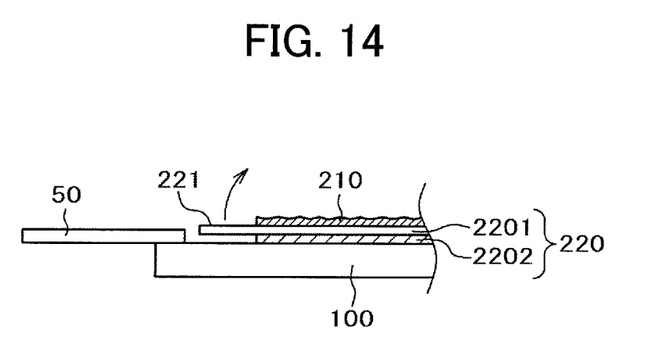
FIG. 14 is a cross-sectional view of the touch panel from which the front window is separated, according to the present invention.

FIG. 14 is a schematic cross-sectional view of the touch panel 100 from which the front window 200 is detached in the configuration shown in FIG. 10 according to the present invention. In the configuration shown in FIG. 10, the cutter blade 300 shown in FIG. 12 is also used to separate the touch panel 100 and the front window 200 from each other. In this case, the separation is performed by passing the thin wire 301 of the cutter blade 300 through the UV curable resin 210. The UV curable resin 210 is also thermoplastic, and can be cut by heating.

In FIG. 14, the PET film 220 is present on the touch panel side, with the residue left after cutting the UV curable resin 210 on the PET film 220. In FIG. 14, the touch panel 100 can be reused by removing the PET film 220 left on the surface of the touch panel 100. FIG. 14 shows the cross section of the corner of the PET film 220. The tab 221 is present in this area in which the adhesive material 2202 is not formed on the substrate 2201 of the PET film 220. This configuration makes it possible to detach the PET film 220 from the touch panel 100 starting from the tab 221. The residue of the UV curable resin 210 can also be removed when the PET film 220 is detached from the touch panel 100.

In this way, it is possible to omit the operation of wiping off the residue of the UV curable resin 210 by hand. As a result, the cost for the touch panel reproduction can be suppressed. Further, it is also possible to reduce the risk that the surface of the touch panel 100 will be scratched when the residue of the UV curable resin 210 is wiped off. As a result, the reproduction yield of the touch panel 100 can be improved.

Figure 15:
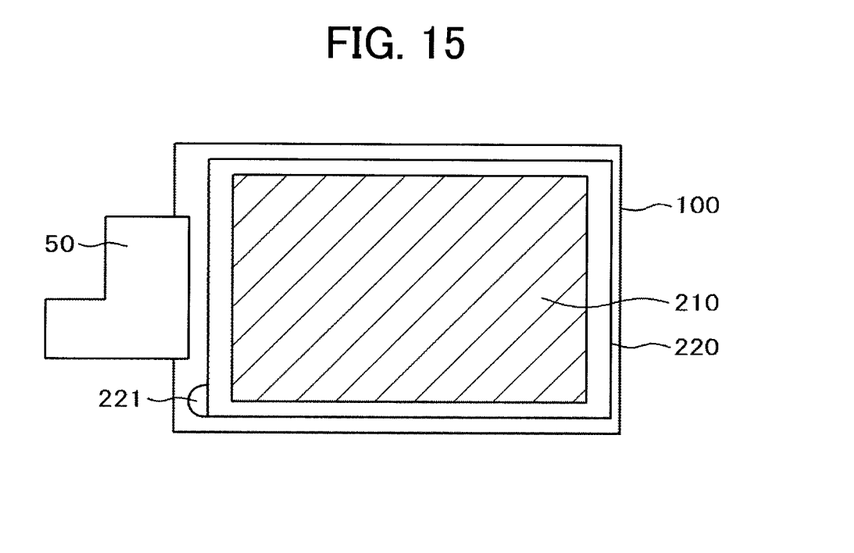
FIG. 15 is a top view showing another example in which the PET film and the UV curable resin are formed on the surface of the touch panel.

FIG. 15 shows another example in which the PET film 220 and the UV curable resin 210 are formed on the touch panel 100. The configuration of FIG. 15 is different from the configuration of FIG. 7, only in the shape of the tab 221 in the corner of the PET film 220. In other words, the tab 221 has a rectangular shape in FIG. 7, but the tab 221 has a semicircular shape in FIG. 15.

Figure 16:
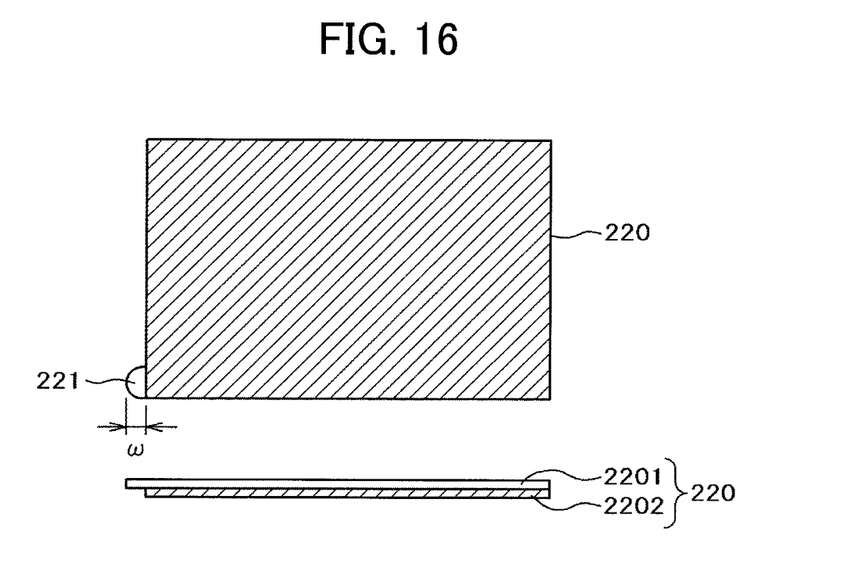
FIG. 16 shows another example of the shape of the PET film.

FIG. 16 is a schematic view showing only the shape of the PET film 220 in FIG. 15. In FIG. 16, the adhesive material 2202 is formed on the substrate 2201 of the PET film 220. However, the adhesive sheet 2202 is not formed in the area of the semicircular tab 221 formed in a corner of the PET film 220. In this case also, the width of the tab 221, namely, the protrusion w is 0.2 mm or more. In the example of FIG. 15 or 16, the tab 221 has a semicircular shape, but may have oval or other shapes.

Figure 17:
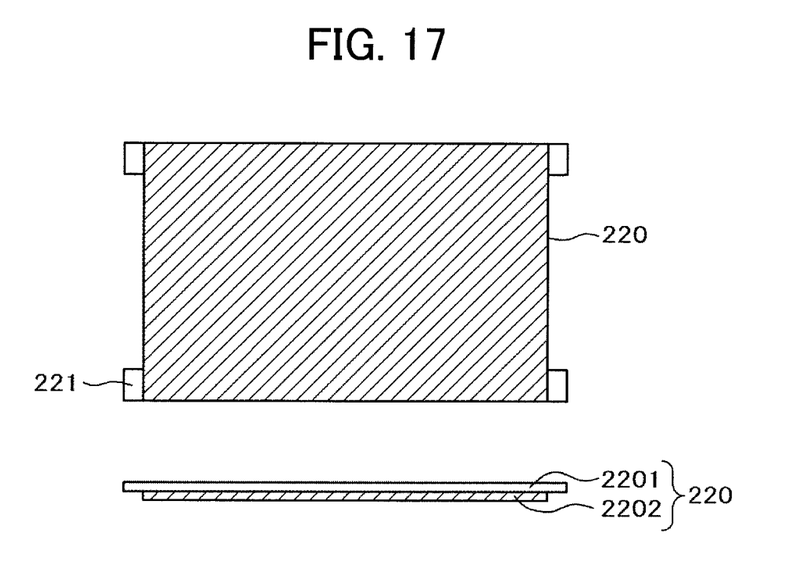
FIG. 17 shows still another example of the shape of the PET film.

FIG. 17 shows another example of the PET film 220 to be attached to the touch panel 100. The tab 221 is provided in the four corners of the PET film 220. The detachment operation can be performed using the tab 221 provided in one of the four corner areas, from which the PET film 220 is most easily detached. In FIG. 17, the tab 221 has a rectangular shape, but may have semicircular, oval, or other shapes. In FIG. 17, the tab 221 is formed in corners on short sides, but may be formed in corners on long sides. Further, in FIG. 17, the tab 221 is formed in the four corners, but may be formed in two or three corners.

Second Embodiment

Figure 18:
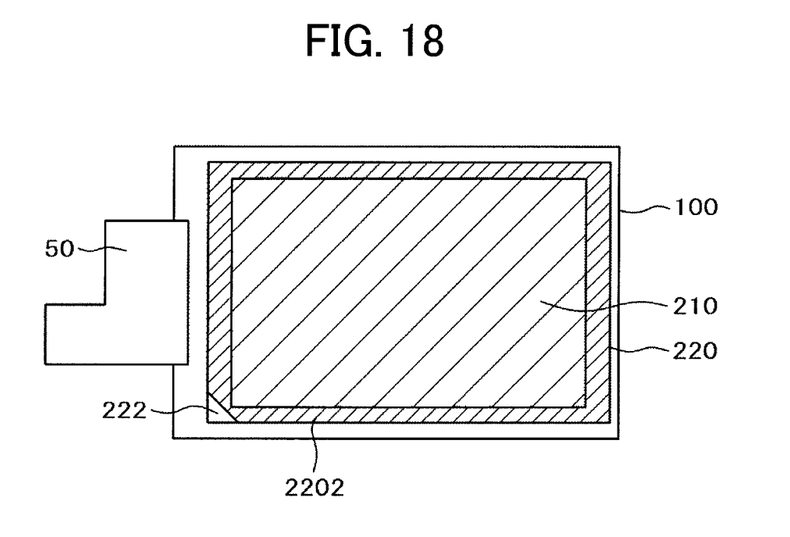
FIG. 18 is a top view in which the PET film and the UV curable resin are formed on the surface of the touch panel, according to a second embodiment.

In a second embodiment, the state of bonding between the touch panel 100 and the front window 200 is the same as that in FIG. 9. The second embodiment is different from the first embodiment in the shape of the PET film 220. FIG. 18 is a top view of the touch panel 100 according to the second embodiment, in which the PET film 220 and the UV curable resin 210 are formed in the touch panel 100, and in which the front window 200 is not attached to the touch panel 100. In FIG. 18, the tab 221 is not formed in the PET film 220. However, there is an area 222 in which the adhesive material 2202 is not formed in a corner of the PET film 220. When a defect is found after the touch panel 100 and the front window 200 are bonded together, the touch panel 100 is reproduced by detaching the touch panel 100 and the front window 200 from each other. At this time, the PET film 220 can be detached from the touch panel 100, starting from the area 222 in which the adhesive material 2202 is not present.

Figure 19:
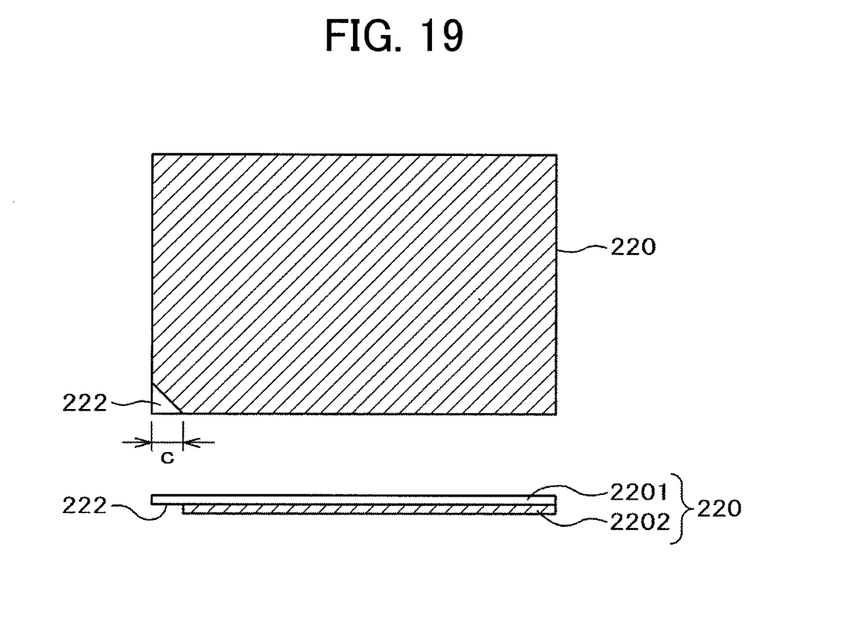
FIG. 19 is a top view of the shape of the PET film according to the second embodiment.

FIG. 19 is a schematic view showing only the PET film 220 in FIG. 18. In FIG. 19, the area 222 has a chamfered shape in which the adhesive material 2202 is not formed in the lower left corner. In FIG. 19, the size of this area is, for example, 0.2 mm or more in the c dimension.

Figure 20:
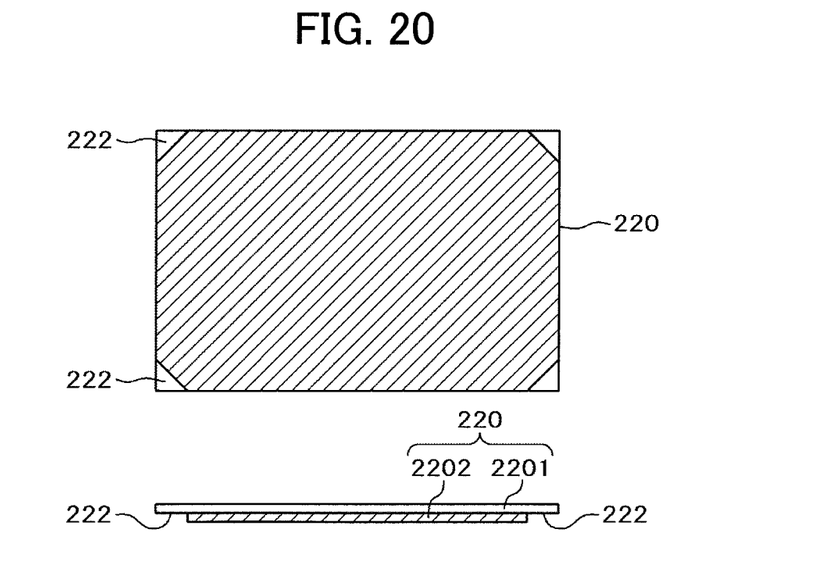
FIG. 20 is a top view of another example of the shape of the PET film according to the second embodiment.

FIG. 20 shows an example in which the area 222, in which the adhesive material 2202 is not formed, is provided in the four corners of the PET film 220. This configuration makes it possible to start from the area 222 of one of the four corner areas, from which the PET film 220 is most easily detached from the touch panel 100. In FIG. 10, the area in which the adhesive material 2202 is not present is provided in the four corners, but may be provided in two or three corners.

As described above, also in the second embodiment, it is possible to reduce the reproduction cost for detaching the touch panel 100 and the front window 200 from each other, and for reproducing the touch panel 100. Further, it is also possible to improve the reproduction yield of the touch panel 100.

What is claimed is:

1. A liquid crystal display device comprising:
  a liquid crystal display panel;
  a backlight;
  a resin mold in which the liquid crystal display panel and the backlight are placed;
  a touch panel attached to the liquid crystal display panel; and
  a front window attached to the touch panel,
  wherein the front window includes a printing frame which is formed as a light-shielding pattern in a periphery of the front window,
  wherein the touch panel and the front window are bonded together by a plastic film including an adhesive material formed on a plastic substrate, and by a UV curable resin,
  wherein the front window is bonded to the plastic substrate of the plastic film by the UV curable resin and the touch panel is bonded to the plastic substrate of the plastic film by the adhesive material which is comprised of a different material than the UV curable resin,
  wherein a tab in which the adhesive material is not formed is present in a corner of the plastic film, said tab being located and configured to facilitate removal of the plastic film from the touch panel for repair of the liquid crystal display device by pulling the tab in an upward direction away from the touch panel without the need to stretch the plastic substrate,
  wherein the tab is provided between the touch panel and the front window,
  wherein an outer end of the tab is overlapped with the touch panel and the front window in plan view,
  a width of the tab is narrower than that of the plastic film, and
  the plastic film being separable from the touch panel at the adhesive material without leaving the UV curable resin on the touch panel.

2. The liquid crystal display device according to claim 1, wherein the plastic film is a PET film.

3. The liquid crystal display device according to claim 1, wherein a protrusion of the tab is 0.2 mm or more.

4. A liquid crystal display device comprising:
  a liquid crystal display panel;
  a backlight;
  a resin mold in which the liquid crystal display panel and the backlight are placed;
  a touch panel attached to the liquid crystal display panel; and
  a front window attached to the touch panel,
  wherein the front window includes a printing frame which is formed as a light-shielding pattern in a periphery of the front window,
  wherein the touch panel and the front window are bonded together by a plastic film including an adhesive material formed on a plastic substrate, and by a UV curable resin,
  wherein the front window is bonded to the plastic substrate of the plastic film by the UV curable resin and the touch panel is bonded to the plastic substrate of the plastic film by the adhesive material which is comprised of a different material than the UV curable resin,
  wherein an area in which the adhesive material is not formed is present in a corner of the plastic film, said area being located and configured to facilitate removal of the plastic film from the touch panel for repair of the liquid crystal display device by pulling the area in an upward direction away from the touch panel without the need to stretch the plastic substrate,
  wherein the area is provided between the touch panel and the front window,
  wherein an outer end of the area is overlapped with the touch panel and the front window in plan view,
  wherein a width of the area in which the adhesive material is not formed is narrower than a width of the plastic film, and
  the plastic film being separable from the touch panel at the adhesive material without leaving the UV curable resin on the touch panel.

5. The liquid crystal display device according to claim 4, wherein the plastic film is a PET film.

6. The liquid crystal display device according to claim 4, wherein the area in which the adhesive material is not formed has a chamfered shape in the corner of the plastic film, and
  wherein an amount of c in the chamfered corner is 0.2 mm or more.

7. A liquid crystal display device comprising:
  a liquid crystal display panel;
  a backlight;
  a resin mold in which the liquid crystal display panel and the backlight are placed;
  a touch panel attached to the liquid crystal display panel; and
  a front window attached to the touch panel,
  wherein the front window includes a printing frame which is formed as a light-shielding pattern in a periphery of the front window,
  wherein the touch panel and the front window are bonded together by a plastic film including an adhesive material formed on a plastic substrate, and by a UV curable resin,
  wherein the front window is bonded to the plastic substrate of the plastic film by the UV curable resin and the touch panel is bonded to the plastic substrate of the plastic film by the adhesive material which is comprised of a different material than the UV curable resin,
  means formed in a corner of the plastic film for facilitating removal of the plastic film from the touch panel for repair of the liquid crystal display device by moving the plastic film in an upward direction away from the touch panel without the need to stretch the plastic substrate,
  wherein the means formed in a corner of the plastic film is provided between the touch panel and the front window,
  an outer end of the means formed in a corner of the plastic film is overlapped with the touch panel and the front window in plan view,
  a width of the means formed in a corner of the plastic film is narrower than a width of the plastic film, and the plastic film being separable from the touch panel at the adhesive material without leaving the UV curable resin on the touch panel.

8. The liquid crystal display device according to claim 7, wherein the plastic film a PET film.

9. The liquid crystal display device according to claim 7, wherein the area in which the adhesive material is not formed has a chamfered shape in the corner of the plastic film, and wherein an amount of c in the chamfered corner is 0.2 mm or more.

* * * * *